(12) United States Patent
Shimizu et al.

(10) Patent No.: US 11,919,573 B2
(45) Date of Patent: Mar. 5, 2024

(54) VEHICLE BODY STRUCTURE, REINFORCEMENT MEMBER, AND REINFORCEMENT MEMBER MANUFACTURING METHOD

(71) Applicant: SUMITOMO HEAVY INDUSTRIES, LTD., Tokyo (JP)

(72) Inventors: Satoshi Shimizu, Ehime (JP); Masayuki Ishizuka, Ehime (JP); Takashi Komatsu, Tochigi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/827,248

(22) Filed: May 27, 2022

(65) Prior Publication Data

US 2022/0289296 A1    Sep. 15, 2022

Related U.S. Application Data

(63) Continuation of application No. PCT/JP2020/045850, filed on Dec. 9, 2020.

(30) Foreign Application Priority Data

Dec. 16, 2019  (JP) ................................. 2019-226632

(51) Int. Cl.
*B62D 27/02*  (2006.01)
*B62D 21/15*  (2006.01)
(Continued)

(52) U.S. Cl.
CPC .......... *B62D 27/023* (2013.01); *B62D 21/15* (2013.01); *B62D 25/02* (2013.01); *B62D 25/04* (2013.01); *B62D 25/06* (2013.01)

(58) Field of Classification Search
CPC ........ B62D 25/06; B62D 25/04; B62D 25/02; B62D 27/023; B62D 21/15; B62D 21/152; B62D 21/157
(Continued)

(56) References Cited

U.S. PATENT DOCUMENTS 4,045,075 A * 8/1977 Pulver .................... B62D 21/08
                                                          280/798
4,732,819 A * 3/1988 Komuro .............. B21C 37/0803
                                                          280/798
(Continued)

FOREIGN PATENT DOCUMENTS

DE        102 47 045 A1    4/2003
EP         1840003 A3  *  7/2008  ........... B62D 21/157
(Continued)

OTHER PUBLICATIONS

Search Report issued in European Application No. 20 90 1331, dated Jan. 12, 2023.
(Continued)

*Primary Examiner* — Dennis H Pedder
(74) *Attorney, Agent, or Firm* — Michael Best & Friedrich LLP

(57) ABSTRACT

A vehicle body structure includes a support member of a vehicle body, and a reinforcement member disposed along a longitudinal direction of the support member of the vehicle body to reinforce the support member of the vehicle body. The reinforcement member is a processed product formed by shaping a tubular body, and includes a flange portion that protrudes on an outer peripheral portion and that is formed in the longitudinal direction of the support member of the vehicle body. The flange portion is joined to the support member of the vehicle body at a location other than locations
(Continued)

where the support member of the vehicle body is joined to other members different from the reinforcement member.

14 Claims, 10 Drawing Sheets

(51) Int. Cl.
  *B62D 25/02* (2006.01)
  *B62D 25/04* (2006.01)
  *B62D 25/06* (2006.01)
(58) Field of Classification Search
  USPC ......... 296/187.12, 209, 193.06, 210, 203.01, 296/203.03, 204
  See application file for complete search history.

(56) References Cited

U.S. PATENT DOCUMENTS

| | | | |
|---|---|---|---|
| 4,986,597 A * | 1/1991 | Clausen | B62D 21/00 |
| | | | 296/205 |
| 5,070,717 A | 12/1991 | Boyd et al. | |
| 5,096,254 A | 3/1992 | Sparke | |
| 6,217,109 B1 | 4/2001 | Okana et al. | |
| 6,692,065 B2 * | 2/2004 | Yamamoto | B62D 25/02 |
| | | | 296/205 |
| 6,709,045 B2 | 3/2004 | Shuto et al. | |
| 6,739,166 B1 | 5/2004 | Shah | |
| 7,543,883 B2 * | 6/2009 | Chen | B62D 25/06 |
| | | | 296/203.03 |
| 8,409,725 B2 * | 4/2013 | Hashimura | B62D 29/008 |
| | | | 428/653 |
| 9,187,135 B1 | 11/2015 | Redmer et al. | |
| 2001/0008228 A1 * | 7/2001 | Meier | B21D 26/033 |
| | | | 219/83 |
| 2008/0035628 A1 | 2/2008 | Dudziak | |
| 2016/0167713 A1 * | 6/2016 | Chung | B62D 25/04 |
| | | | 296/193.06 |
| 2016/0257344 A1 | 9/2016 | Hasegawa et al. | |

FOREIGN PATENT DOCUMENTS

| | | |
|---|---|---|
| JP | H06-001262 A | 1/1994 |
| JP | 2001-010533 A | 1/2001 |
| JP | 2001-206240 A | 7/2001 |
| JP | 2002-145117 A | 5/2002 |
| JP | 2003-054446 A | 2/2003 |
| JP | 2003-118635 A | 4/2003 |
| JP | 2016-159813 A | 9/2016 |
| WO | 2005/051562 A1 | 6/2005 |

OTHER PUBLICATIONS

International Search Report issued in Application No. PCT/JP2020/045850, dated Mar. 2, 2021.

* cited by examiner

FIG. 2
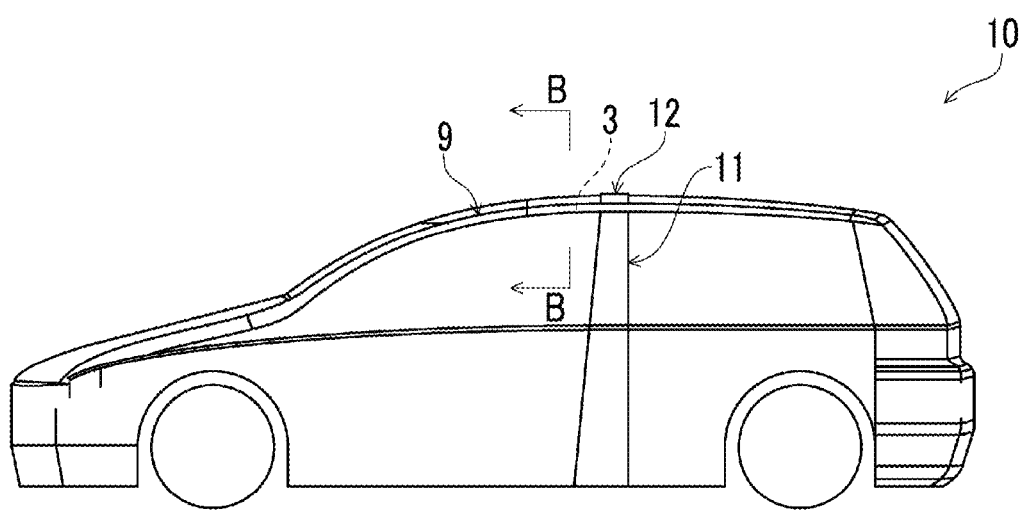
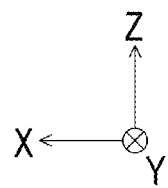

FIG.7
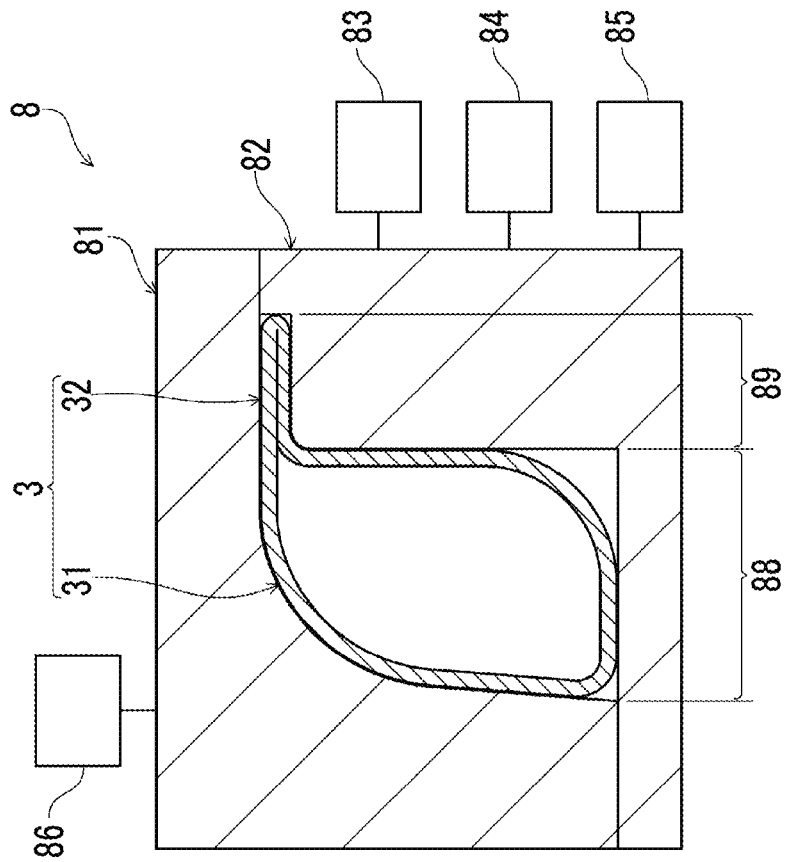
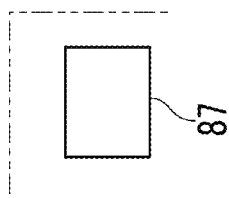

VEHICLE BODY STRUCTURE, REINFORCEMENT MEMBER, AND REINFORCEMENT MEMBER MANUFACTURING METHOD

RELATED APPLICATIONS

The contents of Japanese Patent Application No. 2019-226632, and of International Patent Application No. PCT/JP2020/045850, on the basis of each of which priority benefits are claimed in an accompanying application data sheet, are in their entirety incorporated herein by reference.

BACKGROUND

Technical Field

Certain embodiments relate to a vehicle body structure, a reinforcement member, and a reinforcement member manufacturing method.

Description of Related Art

In the related art, an automotive vehicle such as a sedan type or a wagon type has been known which includes a roof side rail forming a part of a frame of a vehicle body. In addition, examples of the automotive vehicle include an automotive vehicle further including a reinforcement member that reinforces a roof side rail (refer to the related art). In the related art, a pipe-shaped reinforcement member illustrated in FIG. 3 of the related art and a reinforcement member illustrated in FIG. 7 of the related art are disclosed as the reinforcement member.

SUMMARY

According to one aspect of the present invention, there is provided a vehicle body structure including a support member of a vehicle body, and a reinforcement member disposed along a longitudinal direction of the support member of the vehicle body to reinforce the support member of the vehicle body. The reinforcement member is a processed product formed by shaping a tubular body, and includes a flange portion that protrudes on an outer peripheral portion and that is formed in the longitudinal direction of the support member of the vehicle body. The flange portion is joined to the support member of the vehicle body at a location other than locations where the support member of the vehicle body is joined to other members different from the reinforcement member.

According to another aspect of the present invention, there is provided a vehicle body structure including a support member of a vehicle body, and a reinforcement member disposed along a longitudinal direction of the support member of the vehicle body to reinforce the support member of the vehicle body. The reinforcement member is a processed product formed by shaping a tubular body, and includes a flange portion that protrudes on an outer peripheral portion and that is formed in the longitudinal direction of the support member of the vehicle body. The flange portion is joined to the support member of the vehicle body.

According to still another aspect of the present invention, there is provided a reinforcement member that is disposed along a longitudinal direction of a support member of a vehicle body to reinforce the support member of the vehicle body. The reinforcement member is a processed product formed by shaping a tubular body, and includes a flange portion that protrudes on an outer peripheral portion and that is formed in the longitudinal direction of the support member of the vehicle body. The flange portion is joined to the support member of the vehicle body at a location other than locations where the support member of the vehicle body is joined to other members different from the reinforcement member.

According to still another aspect of the present invention, there is provided a method for manufacturing the reinforcement member of the present invention, the method including shaping a tubular body having a circular cross-sectional shape and serving as a base material of the reinforcement member by applying a force to the tubular body from an outside and an inside, to form a pipe portion having a non-circular cross-sectional shape and a flange portion protruding from an outer peripheral side of the pipe portion.

BRIEF DESCRIPTION OF THE DRAWINGS

FIG. 2 is a view seen from a direction of arrow A in FIG. 1.

FIG. 7 is a view illustrating, in order, the process of manufacturing the reinforcement member provided in the vehicle body structure (first embodiment) of the present invention (cross-sectional view illustrating a die clamped state).

DETAILED DESCRIPTION

The pipe-shaped reinforcement member that is the former reinforcement member is configured as one hollow member having a ring-shaped cross-sectional shape. For example, when an automotive vehicle receives an impact from the side, such a hollow member is easily bent together with the roof side rail, which is a concern.

In addition, the latter reinforcement member is configured as a hollow member formed in a tubular shape by joining two plate-shaped members. Since such a hollow member is formed by joining the two plate-shaped members, the reinforcement strength of such a hollow member is more decreased than the one hollow member.

As described above, both the reinforcement members are insufficient to reinforce the roof side rail.

It is desirable to provide a vehicle body structure, a reinforcement member, and a reinforcement member manufacturing method capable of sufficiently reinforcing a roof side rail, with a simple configuration.

According to the present invention, with a simple configuration in which the reinforcement member including the flange portion is joined to the roof side rail at the flange portion, the mechanical strength at the flange portion is increased, and thus it is possible to sufficiently reinforce the roof side rail.

Hereinafter, a vehicle body structure, a reinforcement member, and a reinforcement member manufacturing method of the present invention will be described in detail based on exemplary embodiments illustrated in the accompanying drawings.

First Embodiment

Figure 1:
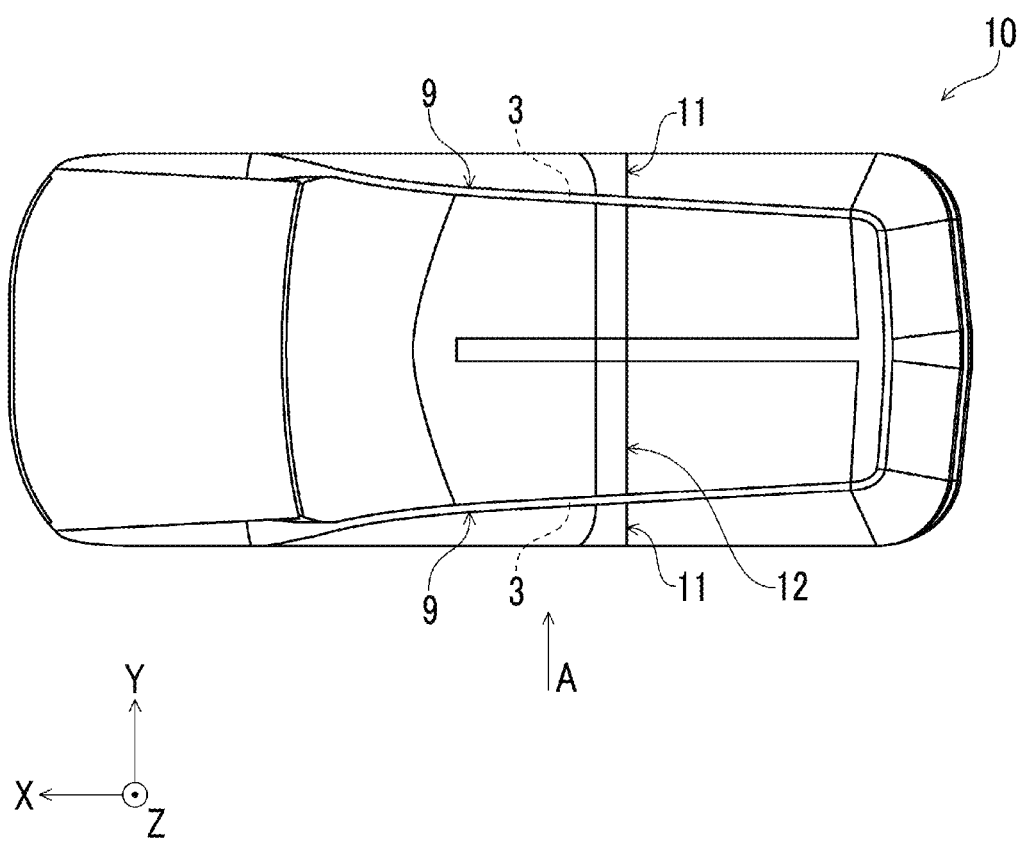
FIG. 1 is a plan view of a vehicle including a vehicle body structure (first embodiment) of the present invention.
Figure 3:
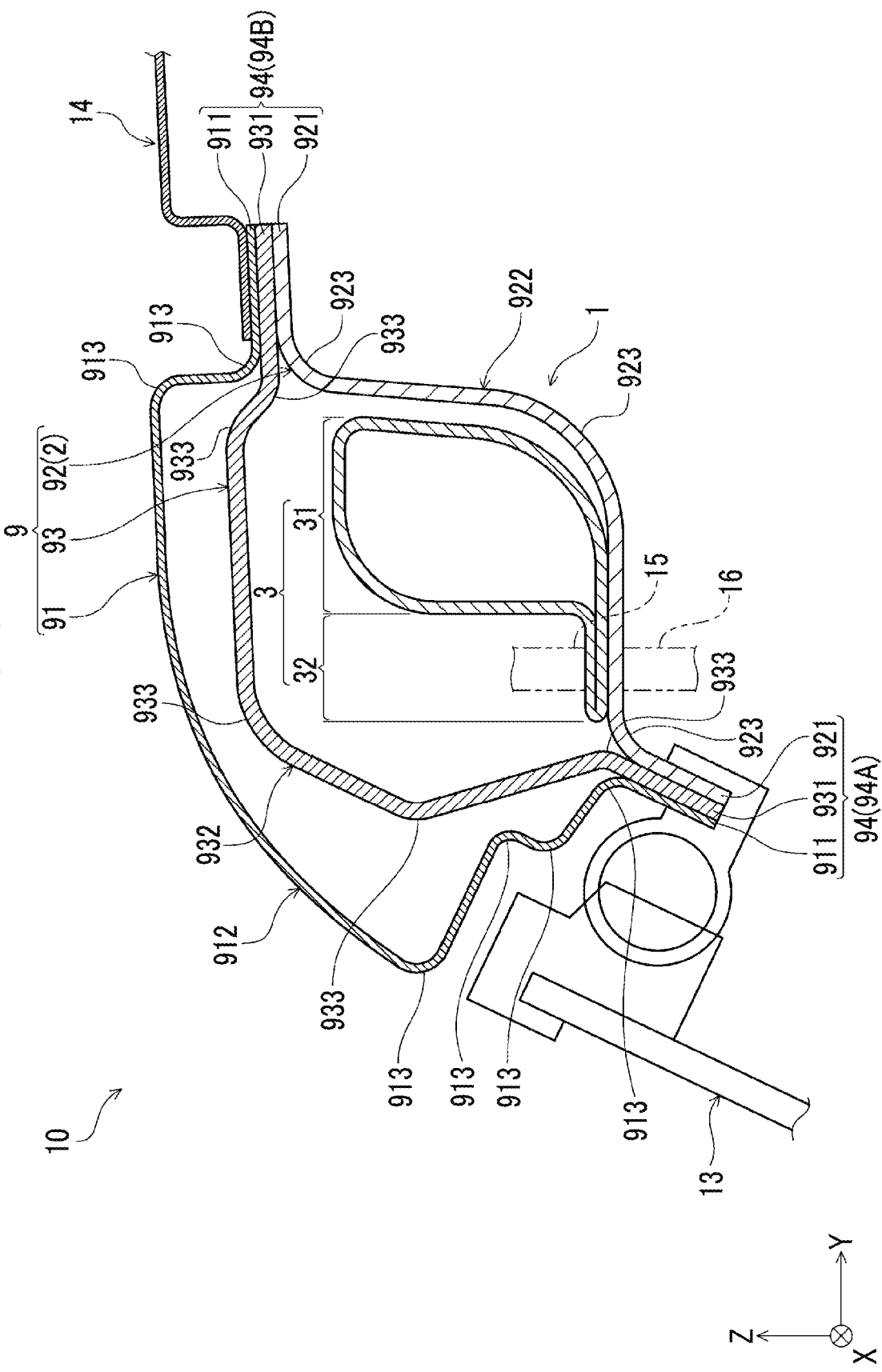
FIG. 3 is a longitudinal sectional view taken along line B-B in FIG. 2.
Figure 4:
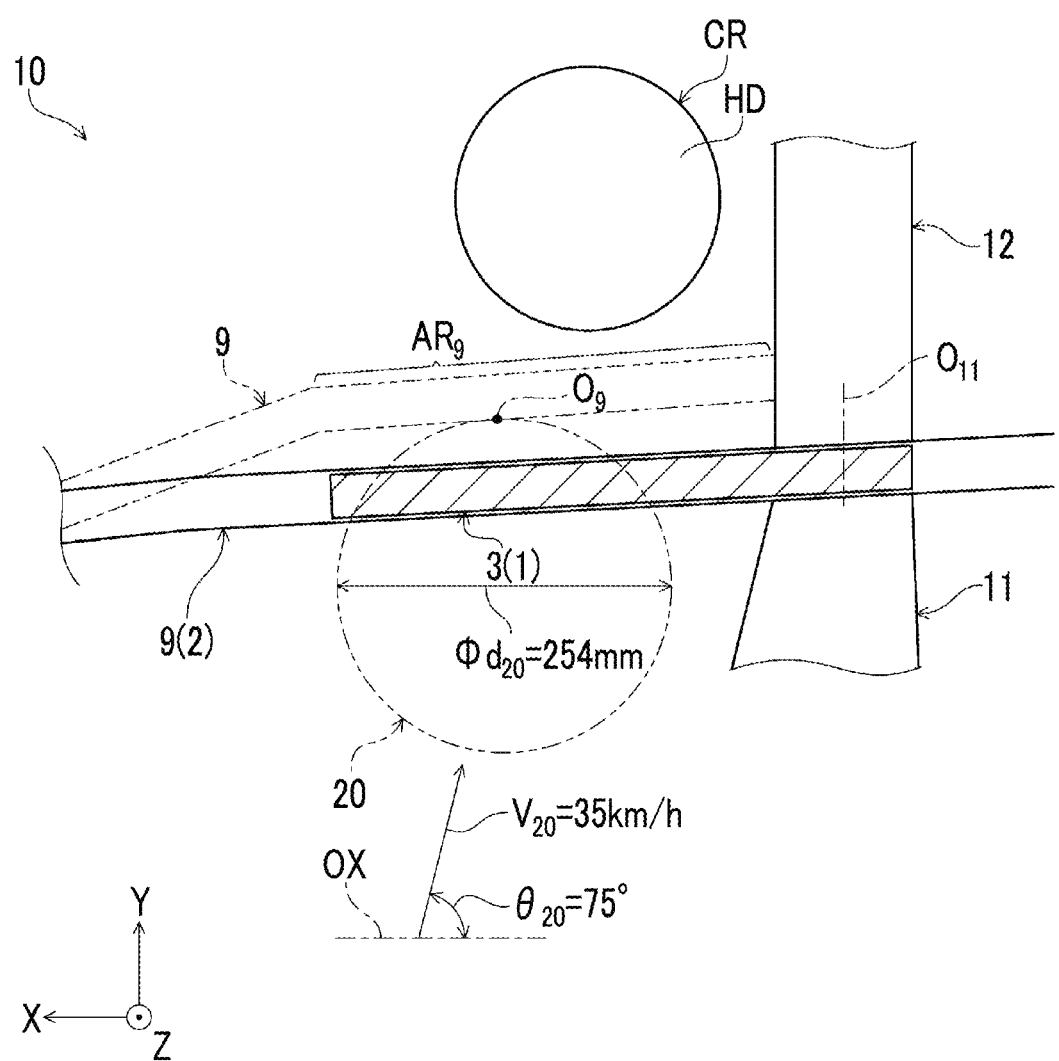
FIG. 4 is a plan view illustrating a state where an occupant protection test in the event of a pole side collision is performed on the vehicle illustrated in FIG. 1.
Figure 5:
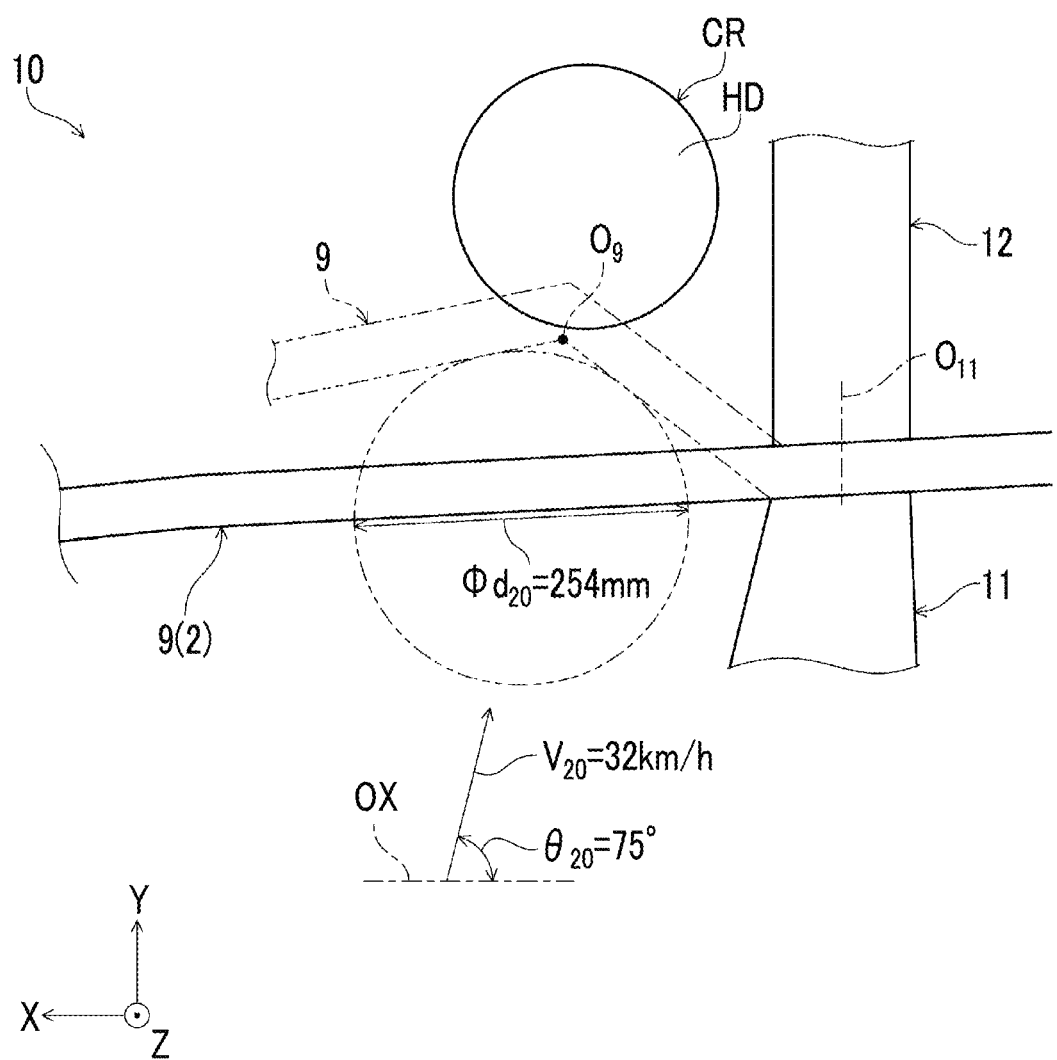
FIG. 5 is a plan view illustrating a state where an occupant protection test in the event of a pole side collision is performed on a vehicle in the related art.
Figure 6:
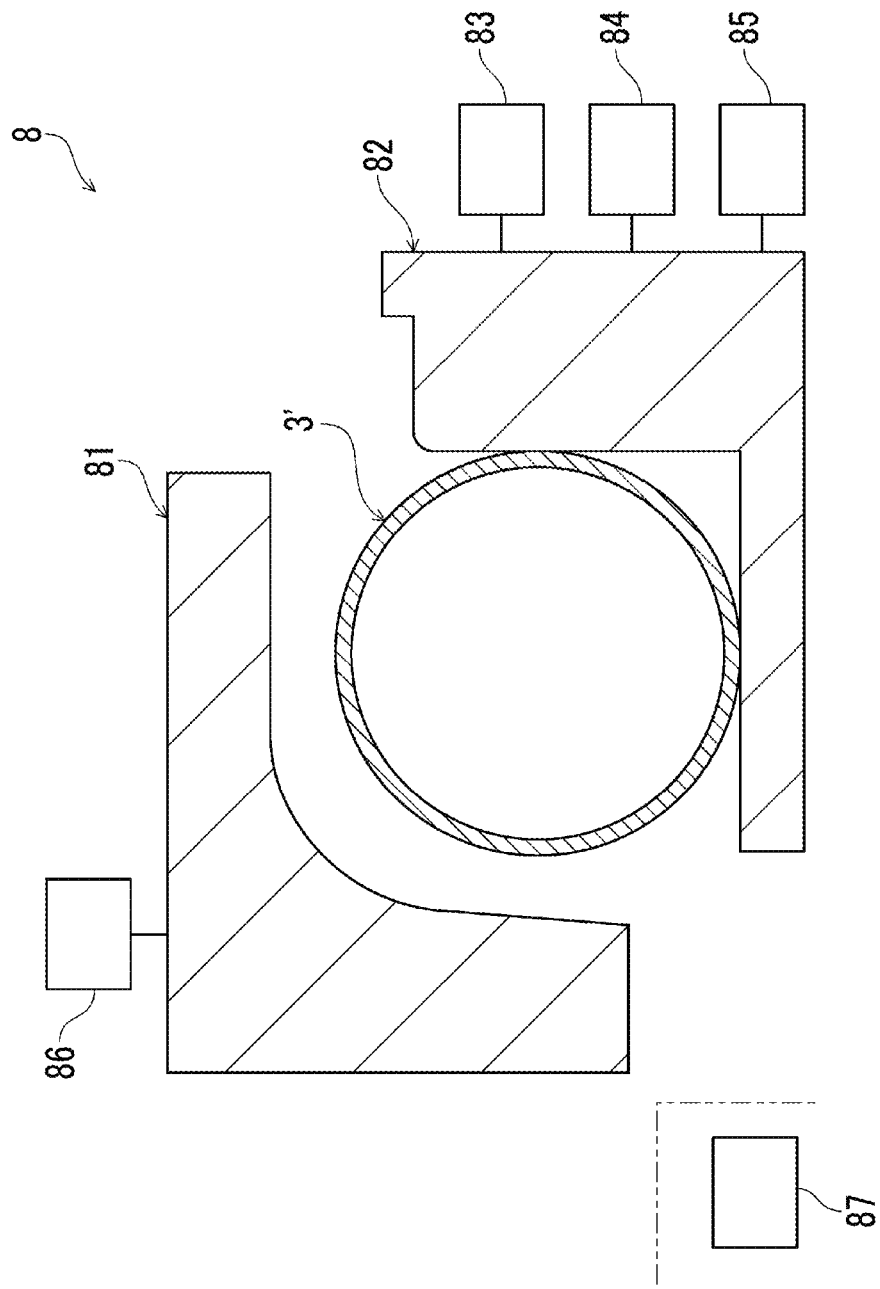
FIG. 6 is a view illustrating, in order, a process of manufacturing a reinforcement member provided in the vehicle body structure (first embodiment) of the present invention (cross-sectional view illustrating a die open state).

FIG. 1 is a plan view of a vehicle including a vehicle body structure (first embodiment) of the present invention. FIG. 2 is a view seen from a direction of arrow A in FIG. 1. FIG. 3 is a longitudinal sectional view taken along line B-B in FIG. 2. FIG. 4 is a plan view illustrating a state where an occupant protection test in the event of a pole side collision is performed on the vehicle illustrated in FIG. 1. FIG. 5 is a plan view illustrating a state where an occupant protection test in the event of a pole side collision is performed on a vehicle in the related art. FIG. 6 is a view illustrating, in order, a process of manufacturing a reinforcement member provided in the vehicle body structure (first embodiment) of the present invention (cross-sectional view illustrating a die open state). FIG. 7 is a view illustrating, in order, the process of manufacturing the reinforcement member provided in the vehicle body structure (first embodiment) of the present invention (cross-sectional view illustrating a die clamped state). Incidentally, hereinafter, for convenience of description, a total length direction of an automotive vehicle is an X-axis direction, a vehicle width direction of the automotive vehicle is a Y-axis direction, and a vehicle height direction of the automotive vehicle is a Z-axis direction.

As illustrated in FIGS. 1 and 2, an automotive vehicle 10 includes a plurality of support members forming frames of a vehicle body, and the support member includes two roof side rails 9, two center pillars (B pillars) 11, and one roof reinforcement 12.

The roof side rails 9 are beam members that are disposed on both left and right sides of the automotive vehicle 10, respectively.

The center pillars 11 are pillar members that are disposed at central portions on both the left and right sides of the automotive vehicle 10, respectively. The center pillar 11 is joined to the roof side rail 9. The joining method is not particularly limited, and for example, a welding method can be used.

The roof reinforcement 12 is a beam member that is disposed across an upper portion of the automotive vehicle 10 between the two roof side rails 9. The roof reinforcement 12 is also joined to the roof side rail 9. The joining method is not particularly limited, and for example, the same method as the method for joining the center pillar 11 and the roof side rail 9 can be used.

Incidentally, each of the roof side rail 9, the center pillar 11, and the roof reinforcement 12 is made of, for example, a metal material such as aluminum.

In addition, in the present embodiment, a wagon-type automotive vehicle will be described as one example of the automotive vehicle 10, but the automotive vehicle 10 is not limited to the wagon-type automotive vehicle, and may be, for example, a sedan-type automotive vehicle, a truck, or the like. In addition, the present invention is also applicable to other vehicle bodies of the automotive vehicle 10.

As illustrated in FIG. 3, the roof side rail 9 includes a side outer 91, a roof side inner 92, and a roof side outer 93, and is configured as a hollow body in which these members are joined to each other.

The side outer 91 is a member forming an outermost exterior of the automotive vehicle 10. The side outer 91 is configured as a long plate member, and edge portions located on both sides in a width direction of the side outer 91 are joints 911. A central portion 912 of the side outer 91 in the width direction, namely, the central portion 912 that is a portion between the joints 911 includes a deformed portion 913 that is curved or bent and plastically deformed into a desired shape at a plurality of locations. In addition, the cross-sectional shape of the central portion 912 has a shape bulging toward the outside of the automotive vehicle 10 as a whole.

The roof side inner 92 is a member forming an interior of the automotive vehicle 10. The roof side inner 92 is also configured as a long plate member, and edge portions located on both sides in a width direction of the roof side inner 92 are joints 921. A central portion 922 of the roof side inner 92 in the width direction, namely, the central portion 922 that is a portion between the joints 921 includes a deformed portion 923 that is curved or bent and plastically deformed into a desired shape at a plurality of locations. In addition, the cross-sectional shape of the central portion 922 has a shape bulging toward the inside of the automotive vehicle 10 as a whole.

The roof side outer 93 is a member located between the side outer 91 and the roof side inner 92. The roof side outer 93 is also configured as a long plate member, and edge portions located on both sides in a width direction of the roof side outer 93 are joint 931. A central portion 932 of the roof side outer 93 in the width direction, namely, the central portion 932 that is a portion between the joints 931 includes a deformed portion 933 that is curved or bent and plastically deformed into a desired shape at a plurality of locations. In addition, the cross-sectional shape of the central portion 932 has a shape bulging toward the outside of the automotive vehicle 10 as a whole.

In the roof side rail 9, the joints 911 of the side outer 91, the joint 921 of the roof side inner 92, and the joint 931 of the roof side outer 93 are joined together in an overlapped state. The joining method is not particularly limited, for example, a welding method can be used, and particularly, it is preferable that spot welding is used. The plate members, namely, the joint 911, the joint 921, and the joint 931 can be quickly and easily joined together by using spot welding. Hereinafter, a portion in which the joint 911, the joint 921, and the joint 931 are collectively joined together is referred to as a "joint portion 94".

In the roof side rail 9, one joint portion 94A of two joint portions 94 is located on a door 13 side, and the other joint portion 94B is located on a roof panel 14 side. In addition, the joint portion 94B is joined to a lower side (back side) of a roof panel 14. Spot welding can also be used as the joining method.

As illustrated in FIG. 3, a reinforcement member 3 that reinforces the roof side rail 9 is disposed inside the roof side rail 9. The reinforcement member 3 forms a vehicle body structure 1, together with a roof side rail member 2 used as a part of the roof side rail 9. Hereinafter, the vehicle body structure 1 will be described.

The vehicle body structure 1 includes the roof side rail member 2 and the reinforcement member 3 joined to the roof side rail member 2.

In the present embodiment, the roof side rail member 2 to which the reinforcement member 3 is joined is the roof side inner 92 of the side outer 91, the roof side inner 92, and the roof side outer 93. Then, the roof side inner 92 is reinforced and has improved mechanical strength against external force by joining the reinforcement member 3 to the roof side inner 92. Particularly, when the automotive vehicle 10 receives a collision from the side, the roof side rail 9 (roof side inner 92) is desired to have resistance against the impact of the collision. Therefore, the reinforcement member 3 has a function of improving the impact resistance of the roof side rail 9.

When the impact resistance of the roof side rail 9 is evaluated, "an occupant protection test in the event of a pole side collision (hereinafter, simply referred to as an "occupant protection test")" set forth in Regulation No. 135 based on the AGREEMENT CONCERNING THE ADOPTION OF UNIFORM TECHNICAL PRESCRIPTIONS FOR WHEELED VEHICLES, EQUIPMENT AND PARTS is performed. As illustrated in FIG. 4, in the occupant protection test, for example, in the case of the automotive vehicle 10 having a vehicle width of 1.5 m or less, a pole (impactor) 20 imitating a utility pole or the like collides toward a position where a head HD of an occupant CR riding on a front side of the automotive vehicle 10 is assumed to be located. A collision angle $\theta_{20}$ at this time is 75° with respect to an axis OX parallel to the X-axis direction. A collision speed $V_{20}$ is 32 km/h. In addition, a diameter $\varphi d_{20}$ of the pole 20 is 254 mm.

As illustrated in FIGS. 3 and 4, the reinforcement member 3 has a tubular shape, and is disposed along a longitudinal direction of the roof side inner 92 (roof side rail member 2). As will be described later, the reinforcement member 3 is a shaped body, namely, a processed product that is formed by shaping one tubular body having a circular cross-sectional shape and serving as a base material 3' of the reinforcement member 3. Accordingly, the mechanical strength of the reinforcement member 3 itself is higher than that when the reinforcement member 3 is configured as, for example, a joined body in which a plurality of members are joined together.

Then, the reinforcement member 3 that is a processed product from the base material 3' includes a pipe portion (ring-shaped portion) 31 having a non-circular cross-sectional ring shape, and a flange portion 32 protruding from an outer peripheral side of the pipe portion 31.

The pipe portion 31 has a higher occupancy ratio (volume ratio) in the reinforcement member 3 than the flange portion 32.

The flange portion 32 is a protruding piece that protrudes on an outer peripheral portion of the reinforcement member 3 and that is formed in a plate shape over the total length of the reinforcement member 3 along the longitudinal direction of the roof side inner 92. The flange portion 32 is an overlap portion in which the base material 3' is crushed and parts of pipe walls of the base material 3' overlap each other. In addition, a protruding direction of the flange portion 32 faces an outer side surface of the automotive vehicle 10, namely, a negative side in the Y-axis direction opposite to a collision direction of the pole 20.

The flange portion 32 is joined to the roof side inner 92. The joining location is a location other than the joint 921 at which the roof side inner 92 (roof side rail member 2) is collectively joined to other members different from the reinforcement member 3, namely, to the side outer 91 and to the roof side outer 93, and is the central portion 922 in the present embodiment.

In addition, the flange portion 32 is joined to the roof side rail member 2 by welding. Then, for example, spot welding can be used for the welding. Accordingly, before the roof side inner 92 and the reinforcement member 3 are assembled as a part of the automotive vehicle 10, the central portion 922 of the roof side inner 92 and the flange portion 32 of the reinforcement member 3 can be quickly and easily joined together by applying a voltage to the central portion 922 of the roof side inner 92 and the flange portion 32 of the reinforcement member 3 that are sandwiched between a positive electrode 15 and a negative electrode 16 used for spot welding (refer to the positive electrode 15 and the negative electrode 16 illustrated by two-dot chain lines in FIG. 3). Incidentally, since the central portion 922 and the flange portion 32 form a laminated body of plate-shaped portions, spot welding can be performed thereon.

A comparison will be made between a case where the occupant protection test is performed on the roof side rail 9 (roof side inner 92) to which the reinforcement member 3 configured as described above is joined (refer to FIG. 4) and a case where the occupant protection test is performed on the roof side rail 9 in which the reinforcement member 3 is omitted (refer to FIG. 5).

As illustrated in FIG. 4, in the former case of the occupant protection test, a predetermined range $AR_9$ that is linear along the longitudinal direction in the roof side rail 9 enters the inside of the automotive vehicle 10 with a collision point $O_9$ at the moment of collision of the pole 20 as an intermediate point, but the entering of the roof side rail 9 to the head HD of the occupant CR is prevented (state of the roof side rail 9 after the collision is illustrated by two-dot chain lines). Accordingly, the head HD of the occupant CR is protected.

On the other hand, as illustrated in FIG. 5, in the latter case of the occupant protection test, the roof side rail 9 is bent at the collision point $O_9$, enters the inside of the automotive vehicle 10, and reaches the head HD of the occupant CR (state of the roof side rail 9 after the collision is indicated by two-dot chain lines).

As described above, the reinforcement member 3 is a member that prevents or suppresses unintentional bending of the roof side rail 9 (roof side rail member 2) to the inside of the automotive vehicle 10 when the occupant protection test is performed. Accordingly, the head HD of the occupant CR can be protected in the event of a collision. Therefore, with a simple configuration in which the reinforcement member 3 including the flange portion 32 is joined to the roof side rail 9, the roof side rail 9 can be sufficiently reinforced, and thus the collision safety performance of the automotive vehicle 10 is enhanced.

In addition, the flange portion 32 is joined to the roof side inner 92 at a location other than locations where the roof side inner 92 (roof side rail member 2) is joined to other members different from the reinforcement member 3, namely, to the side outer 91 and to the roof side outer 93. Accordingly, the protruding direction of the flange portion 32 having a plate shape can face the outer side surface of the automotive vehicle 10, namely, the negative side in the Y-axis direction opposite to the collision direction of the pole 20. Then, it is very difficult to bend the flange portion 32 having a plate shape at the collision point $O_9$ in the width direction. Accordingly, the mechanical strength of the reinforcement member 3 is further improved, and it is possible to sufficiently prevent or suppress unintentional bending of the roof side rail 9 to the inside of the automotive vehicle 10 in the event of a collision.

In addition, since the flange portion 32 is jointed only to the roof side inner 92, spot welding can be used for the joining. In this case, spot welding is facilitated, and the state of joining between the flange portion 32 and the roof side inner 92 after welding can be firmly maintained for a long period of time.

As illustrated in FIG. 4, a part of the reinforcement member 3 overlaps an extension line $O_{11}$ of the center pillar 11. Accordingly, it is possible to prevent the roof side rail 9 from being bent inward at the roof reinforcement 12 in the event of a collision (refer to the roof side rail 9 after the collision illustrated by two-dot chain lines in FIG. 5), thereby contributing to the protection of the head HD of the occupant CR. Incidentally, the extension line $O_{11}$ also overlaps the roof reinforcement 12.

In addition, a total length of the reinforcement member 3 is shorter than a total length of the roof side inner 92 (roof side rail member 2). Accordingly, a portion that is desired to be reinforced in the roof side inner 92 can be intensively (preferentially) reinforced without excess or deficiency.

As described above, the reinforcement member 3 is disposed inside the roof side rail 9. On the other hand, as an example where the reinforcement member 3 is disposed outside the roof side rail 9, when the reinforcement member 3 is disposed on an outer side of the automotive vehicle 10, the reinforcement member 3 stands out and impairs the appearance of the automotive vehicle 10, which is a concern. In addition, as another example where the reinforcement member 3 is disposed outside the roof side rail 9, when the reinforcement member 3 is disposed inside the automotive vehicle 10 (inside the vehicle), a comfort zone of the automotive vehicle 10 becomes narrow, and the comfortability inside the vehicle is impaired, which is a concern. However, since the reinforcement member 3 is disposed inside the roof side rail 9, it is possible to prevent the appearance of the automotive vehicle 10 from being impaired, or the comfortability from being impaired.

Incidentally, the reinforcement member 3 is made of, for example, a metal material such as an Fe—C alloy.

Next, a method for manufacturing the reinforcement member 3 will be described. In this manufacturing method, a shaping device 8 is used.

As illustrated in FIGS. 6 and 7, the shaping device 8 includes an upper die 81, a lower die 82, a gas supply unit 83, a heating unit 84, a cooling unit 85, a drive unit 86, and a control unit 87.

The lower die 82 is fixed, and the upper die 81 is supported so as to be able to approach and separate from the lower die 82. As illustrated in FIG. 6, in the die open state of the upper die 81 and the lower die 82, the base material 3' can be disposed between the upper die 81 and the lower die 82. In addition, as illustrated in FIG. 7, in the die clamped state, the upper die 81 and the lower die 82 can define a first cavity 88 forming the pipe portion 31 and a second cavity 89 forming the flange portion 32.

The gas supply unit 83 supplies high-pressure air into the base material 3'. Accordingly, the base material 3' can be prevented from excessively being crushed in the die clamped state. The configuration of the gas supply unit 83 is not particularly limited, and can be configured to include, for example, a compressor.

The heating unit 84 heats the base material 3'. The configuration of the heating unit 84 is not particularly limited, and can be configured to include, for example, two electrodes that are electrically connected to the base material 3', and a voltage application unit that applies a voltage between the electrodes. Accordingly, the base material 3' can be softened by setting the base material 3' to an energized state and by heating the base material 3'.

The cooling unit 85 rapidly cools the reinforcement member 3 (base material 3'). The configuration of the cooling unit 85 is not particularly limited, and can be configured to include, for example, a flow path which is provided in each of the upper die 81 and the lower die 82 and through which a refrigerant passes. Then, when the refrigerant passes through the flow paths, the reinforcement member 3 can be rapidly cooled on each of the upper die 81 and the lower die 82. Incidentally, the refrigerant may be either a liquid or a gas.

The drive unit 86 enables the upper die 81 to approach and separate from the lower die 82 by moving the upper die 81. Accordingly, it is possible to switch between the die open state and the die clamped state. The configuration of the drive unit 86 is not particularly limited, and can be configured to include, for example, a motor, a ball screw connected to the motor, and a linear guide connected to the ball screw.

The control unit 87 controls operation of the gas supply unit 83, the heating unit 84, the cooling unit 85, and the drive unit 86. The configuration of the control unit 87 is not particularly limited, and can be configured to include, for example, a central processing unit (CPU) and various memories.

The shaping device 8 operates as follows.

First, as illustrated in FIG. 6, the upper die 81 and the lower die 82 are set to the die open state, and the base material 3' is disposed between the upper die 81 and the lower die 82.

Next, the heating unit 84 is operated in the die open state. Accordingly, the base material 3' can be softened.

Next, the upper die 81 is approached to the lower die 82. This state does not reach the die clamped state illustrated in FIG. 7, and is a state where a gap is formed between the upper die 81 and the lower die 82. Then, the gas supply unit 83 is operated to perform primary blowing. Accordingly, a part of the base material 3' bulges and enters the gap between the upper die 81 and the lower die 82.

Next, in the die clamped state illustrated in FIG. 7, the gas supply unit 83 is operated to perform secondary blowing. Accordingly, the base material 3' can be deformed according to the shape of the reinforcement member 3, namely, the reinforcement member 3 including the pipe portion 31 and the flange portion 32 is formed.

Next, the cooling unit 85 is operated to rapidly cool the reinforcement member 3. Accordingly, in the reinforcement member 3, austenite is transformed into martensite.

Next, the die open state is set again, and the reinforcement member 3 is taken out. Thereafter, the reinforcement member 3 can be cut to a desired length and joined to the roof side rail member 2.

Second Embodiment

Figure 8:
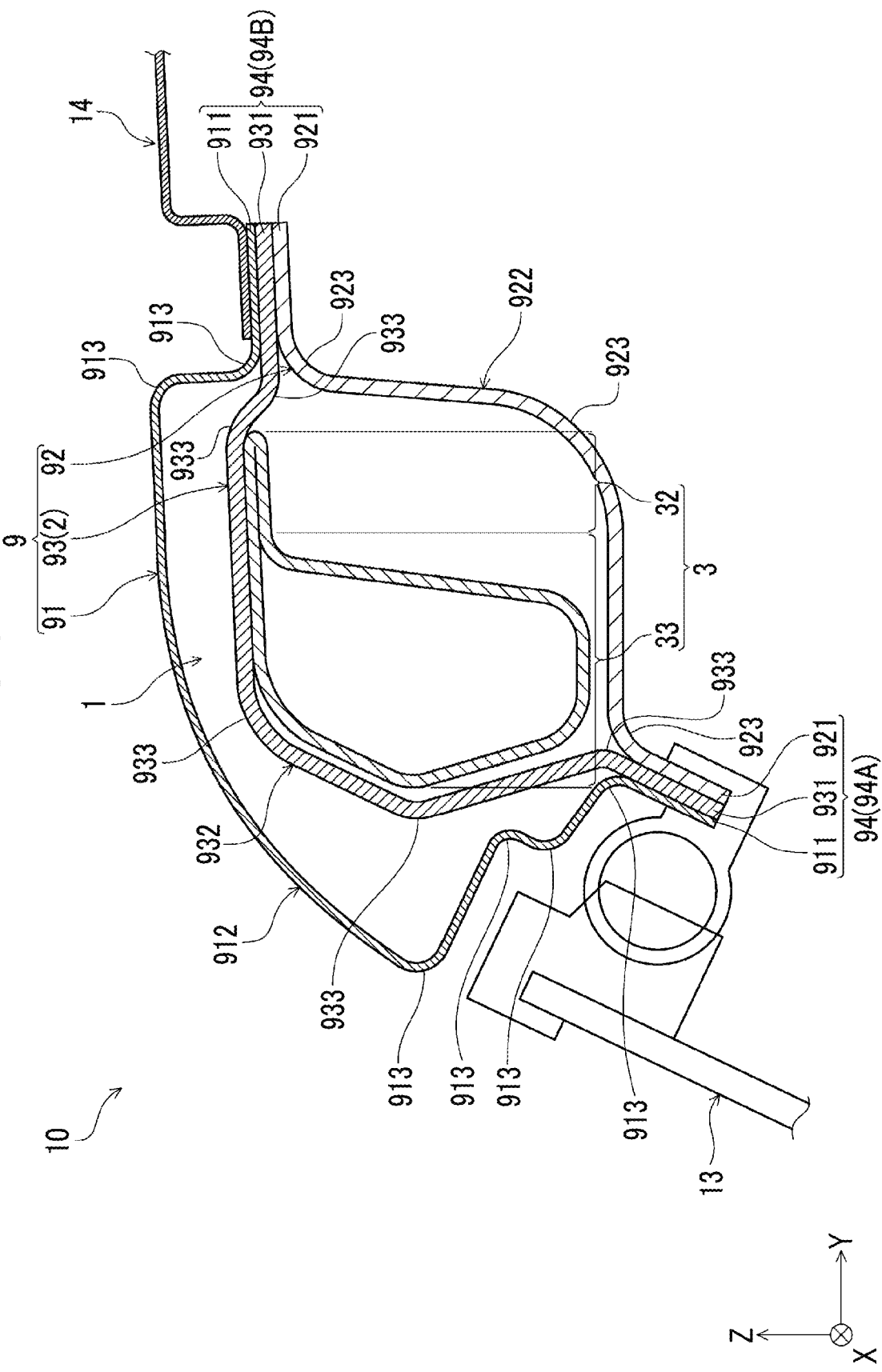
FIG. 8 is a cross-sectional view of a vehicle including a vehicle body structure (second embodiment) of the present invention.

FIG. 8 is a cross-sectional view of a vehicle including a vehicle body structure (second embodiment) of the present invention.

Hereinafter, a second embodiment of a vehicle body structure, a reinforcement member, and a reinforcement member manufacturing method of the present invention will be described with reference to the drawing, but the differences from the above-described embodiment will be mainly described, and a description of the same items will be omitted.

The present embodiment is the same as the first embodiment except that a mating side to which the reinforcement member 3 is joined is different.

As illustrated in FIG. 8, in the vehicle body structure 1 of the present embodiment, the roof side rail member 2 to which the reinforcement member 3 is joined is the roof side outer 93 of the side outer 91, the roof side inner 92, and the roof side outer 93. In this case, the flange portion 32 of the reinforcement member 3 is joined to the central portion 932 of the roof side outer 93.

In addition, the reinforcement member 3 has a posture different from that of the reinforcement member 3 in the first embodiment, and is disposed upside down. Then, a protruding direction of the flange portion 32 of the reinforcement member 3 faces a positive side in the Y-axis direction. Accordingly, similarly to the first embodiment, it is very difficult to bend the flange portion 32 in the width direction, and thus the mechanical strength of the reinforcement member 3 is further improved, and it is possible to sufficiently prevent or suppress unintentional bending of the roof side rail 9 to the inside of the automotive vehicle 10 in the event of a collision.

The vehicle body structure 1 described above has a configuration that is effective when the reinforcement member 3 is desired to be joined to the roof side outer 93.

Third Embodiment

Figure 9:
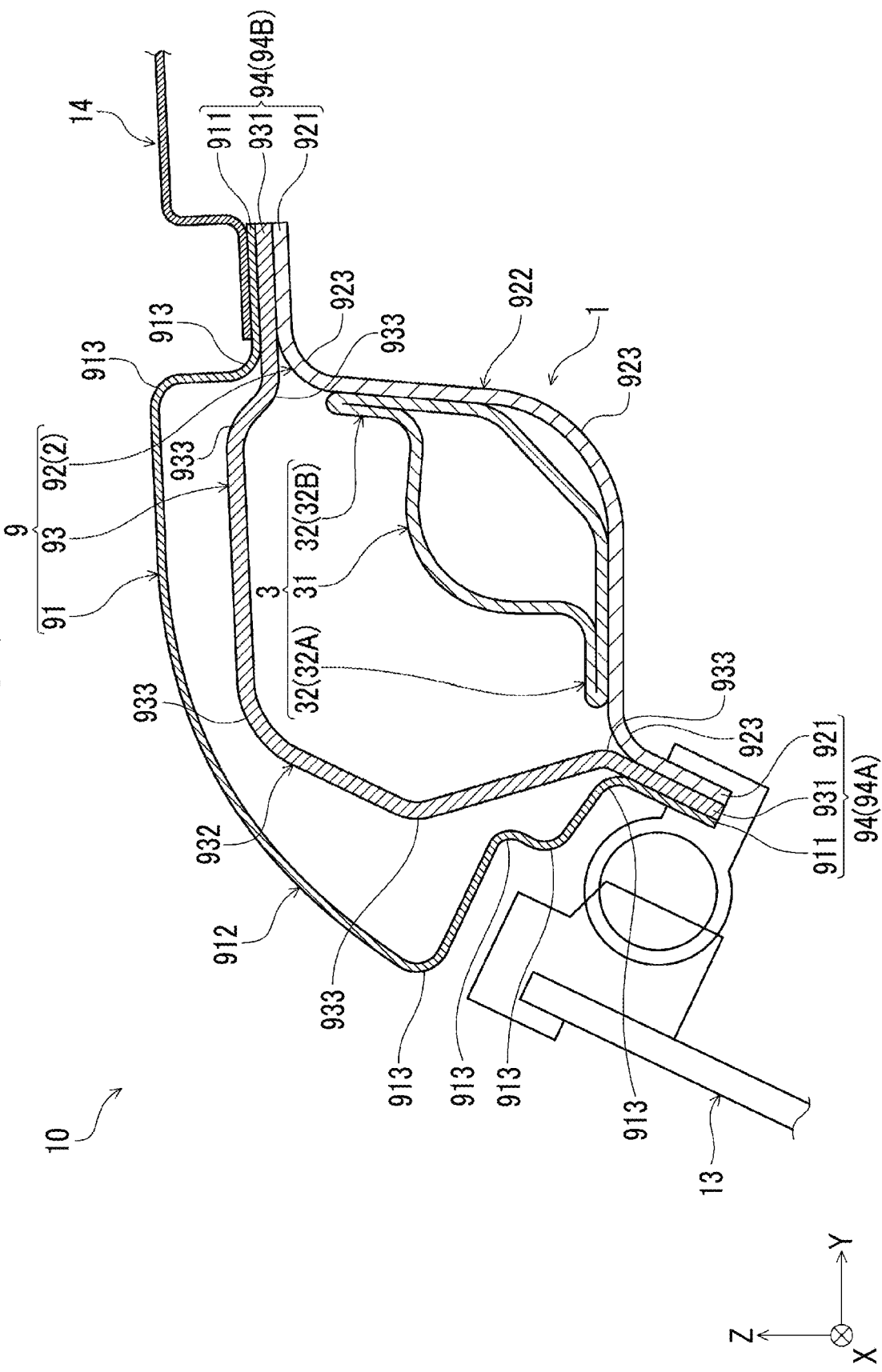
FIG. 9 is a cross-sectional view of a vehicle including a vehicle body structure (third embodiment) of the present invention.

FIG. 9 is a cross-sectional view of a vehicle including a vehicle body structure (third embodiment) of the present invention.

Hereinafter, a third embodiment of a vehicle body structure, a reinforcement member, and a reinforcement member manufacturing method of the present invention will be described with reference to the drawing, but the differences from the above-described embodiment will be mainly described, and a description of the same items will be omitted.

The present embodiment is the same as the first embodiment except that the configuration (shape) of the reinforcement member 3 is different.

As illustrated in FIG. 9, in the present embodiment, the reinforcement member 3 includes two flange portions 32. The flange portions 32 are disposed on both sides of the pipe portion 31 via the pipe portion 31.

In addition, a protruding direction of one flange portion 32A of the two flange portions 32 faces the negative side in the Y-axis direction, and a protruding direction of the other flange portion 32B faces an upper side (positive side in the Z-axis direction).

Since the reinforcement member 3 configured as described above includes the two flange portions 32, the mechanical strength is more increased than the reinforcement member 3 of the first embodiment. Accordingly, the impact resistance of the roof side rail 9 can be further improved.

Fourth Embodiment

Figure 10:
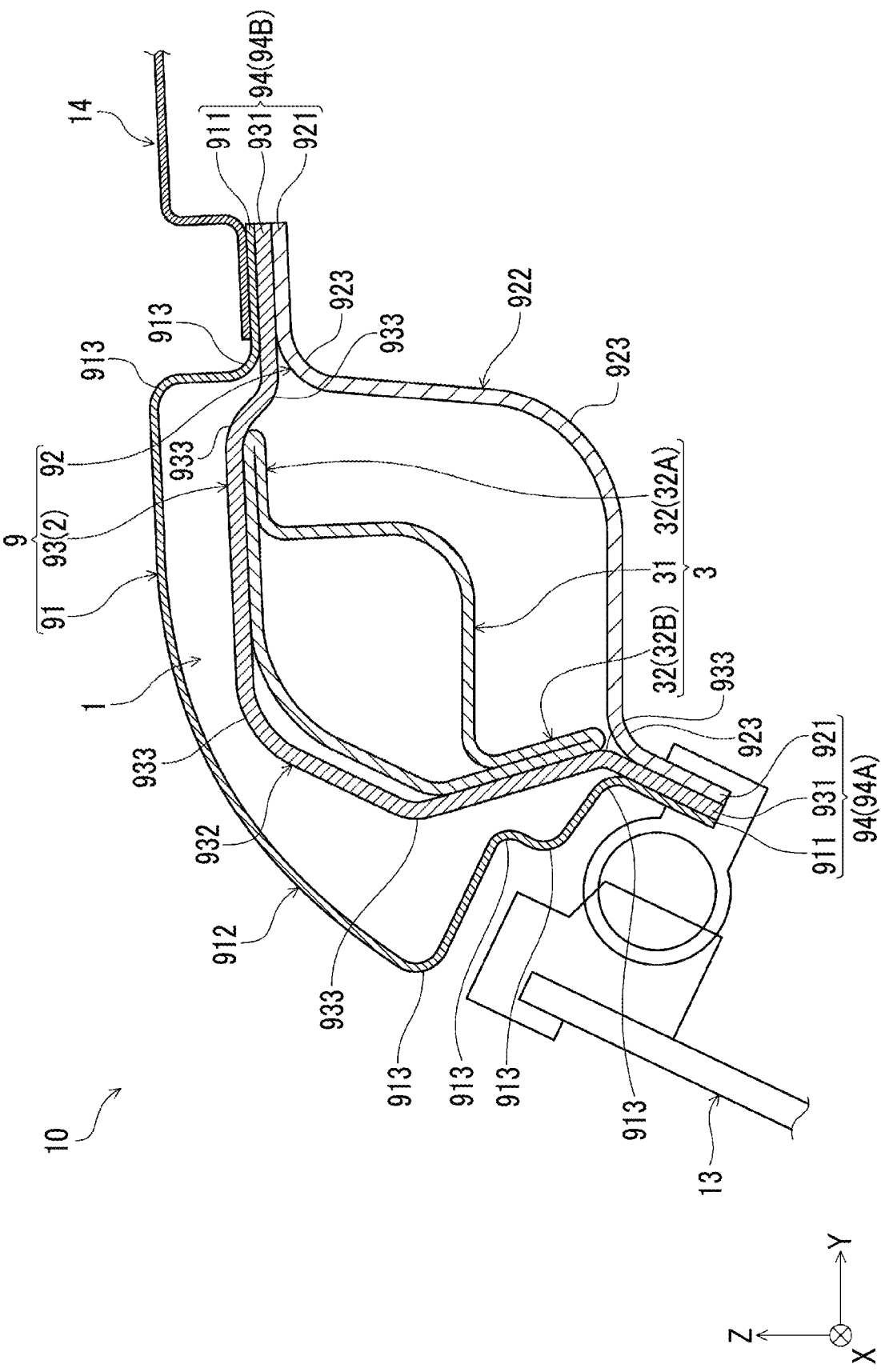
FIG. 10 is a cross-sectional view of a vehicle including a vehicle body structure (fourth embodiment) of the present invention.

FIG. 10 is a cross-sectional view of a vehicle including a vehicle body structure (fourth embodiment) of the present invention.

Hereinafter, a fourth embodiment of a vehicle body structure, a reinforcement member, and a reinforcement member manufacturing method of the present invention will be described with reference to the drawing, but the differences from the above-described embodiment will be mainly described, and a description of the same items will be omitted.

The present embodiment is the same as the third embodiment except that a mating side to which the reinforcement member 3 is joined is different.

As illustrated in FIG. 10, in the vehicle body structure 1 of the present embodiment, the roof side rail member 2 to which the reinforcement member 3 is joined is the roof side outer 93.

In addition, the reinforcement member 3 has a posture different from that of the reinforcement member 3 of the third embodiment, and is disposed upside down. Then, the protruding direction of the flange portion 32A of the reinforcement member 3 faces the positive side in the Y-axis direction, and the protruding direction of the flange portion 32B faces a lower side (negative side in the Z-axis direction).

The vehicle body structure 1 described above has a configuration that is effective when the reinforcement member 3 is desired to be joined to the roof side outer 93.

The vehicle body structure, the reinforcement member, and the reinforcement member manufacturing method of the present invention have been described above based on each of the illustrated embodiments, but the present invention is not limited thereto. In addition, each part forming the vehicle body structure or the reinforcement member can be replaced with any configuration capable of exhibiting the same function. In addition, any component may be added.

In addition, the vehicle body structure, the reinforcement member, and the reinforcement member manufacturing method of the present invention may be a combination of any two or more configurations (features) in the above embodiments.

In addition, the roof side rail member 2 to which the reinforcement member 3 is joined is the roof side inner 92 in the first and third embodiments, and is the roof side outer 93 in the second and fourth embodiments, but is not limited thereto, and the side outer 91 may be used.

In addition, the reinforcement member 3 is disposed inside the roof side rail 9, but is not limited thereto, and may be disposed outside the roof side rail 9.

In addition, the thickness of the flange portion 32 can be appropriately adjusted by the shaping device 8. Accordingly, the joining location of the flange portion 32 can be, for example, between the roof side inner 92 and the roof side outer 93.

It should be understood that the invention is not limited to the above-described embodiment, but may be modified into various forms on the basis of the spirit of the invention. Additionally, the modifications are included in the scope of the invention.

What is claimed is:
1. A vehicle body structure comprising:
a support member of a vehicle body; and
a reinforcement member disposed along a longitudinal direction of the support member of the vehicle body to reinforce the support member of the vehicle body,
wherein the support member of the vehicle body includes a plurality of members of which each edge portion is a joint,
the reinforcement member is a processed product formed by shaping a tubular body, and includes a flange portion that protrudes on an outer peripheral portion and that is formed in the longitudinal direction of the support member of the vehicle body, and the flange portion is an overlap portion in which a base material of the reinforcement member is crushed and parts of pipe walls of the base material overlap each other, and is joined to one of the plurality of members of the support member of the vehicle body at a location other than the joint at which the support member of the vehicle body is joined to other members different from the reinforcement member.

2. The vehicle body structure according to claim 1, wherein the support member of the vehicle body is configured as a hollow body including a first member forming an outermost exterior of the vehicle body, a second member forming an interior of the vehicle body, and a third member located between the first member and the second member, and the reinforcement member is joined to one of the second member and the third member.

3. The vehicle body structure according to claim 2, wherein the reinforcement member is disposed inside the hollow body.

4. The vehicle body structure according to claim 2, wherein the reinforcement member is joined to the third member, and the flange portion faces an inner side surface of the vehicle body.

5. The vehicle body structure according to claim 3, wherein the reinforcement member includes two flange portions.

6. The vehicle body structure according to claim 5, wherein the reinforcement member is joined to the second member, and a protruding direction of one flange portion of the two flange portions faces an outer side surface of the vehicle body and a protruding direction of the other flange portion faces an upper side of the vehicle body.

7. The vehicle body structure according to claim 5, wherein the reinforcement member is joined to the third member, and a protruding direction of one flange portion of the two flange portions faces an inner side surface of the vehicle body and a protruding direction of the other flange portion faces a lower side of the vehicle body.

8. The vehicle body structure according to claim 1, wherein the flange portion faces an outer side surface of the vehicle body.

9. The vehicle body structure according to claim 1, wherein the support member of the vehicle body is joined to a pillar member that is one support member, and a part of the reinforcement member overlaps an extension line of the pillar member.

10. The vehicle body structure according to claim 9, wherein a total length of the reinforcement member is shorter than a total length of the support member of the vehicle body.

11. The vehicle body structure according to claim 1, wherein the reinforcement member prevents or suppresses bending of the support member of the vehicle body to an inside of the vehicle body when an occupant protection test (Regulation No. 135 based on an AGREEMENT CONCERNING THE ADOPTION OF UNIFORM TECHNICAL PRESCRIPTIONS FOR WHEELED VEHICLES, EQUIPMENT AND PARTS) in an event of a pole side collision is performed.

12. The vehicle body structure according to claim 1, wherein the flange portion is joined to the support member of the vehicle body by welding.

13. The vehicle body structure according to claim 12, wherein the welding is spot welding.

14. A method for manufacturing the reinforcement member of the vehicle body structure according to claim 1, the method comprising:

shaping the tubular body having a circular cross-sectional shape and serving as the base material of the reinforcement member by applying a force to the tubular body from an outside and an inside, to form a pipe portion having a non-circular cross-sectional shape and the flange portion protruding from an outer peripheral side of the pipe portion.

* * * * *